United States Patent [19]

Braun

[11] 4,279,675
[45] Jul. 21, 1981

[54] METHOD AND APPARATUS FOR PACKAGING

[75] Inventor: Eric A. Braun, Northville, Mich.

[73] Assignee: Ex-Cell-O Corporation, Troy, Mich.

[21] Appl. No.: 110,870

[22] Filed: Jan. 10, 1980

Related U.S. Application Data

[60] Continuation of Ser. No. 780,137, Mar. 22, 1977, abandoned, which is a continuation of Ser. No. 559,869, Mar. 19, 1975, abandoned, which is a division of Ser. No. 443,594, Feb. 19, 1974, Pat. No. 3,910,014.

[51] Int. Cl.$^3$ .......................... B29C 27/08; B31B 1/28
[52] U.S. Cl. ...................................... 156/73.1; 53/456; 53/565; 53/375; 156/358; 156/580.2; 156/581; 493/133
[58] Field of Search ................... 156/73.1, 73.2, 73.4, 156/358, 580, 580.1, 580.2, 581; 53/373, 375, 479, 484, 456, 565; 93/44.1 R, 44.1 GT; 228/1 R

[56] References Cited

U.S. PATENT DOCUMENTS

| | | | |
|---|---|---|---|
| 2,433,176 | 12/1947 | Van Epps et al. | 156/581 |
| 3,422,730 | 1/1969 | Mitzelfelt et al. | 93/44.1 R |
| 3,439,392 | 4/1969 | McNab, Jr. | 156/580.1 |
| 3,468,731 | 9/1969 | Obeda | 156/581 |
| 3,505,136 | 4/1970 | Attwood | 156/580.1 |
| 3,602,421 | 8/1971 | Spratt, Jr. | 156/580.2 |
| 3,657,033 | 4/1972 | Sager | 156/580.2 |
| 3,679,526 | 7/1972 | Horton | 156/580.1 |
| 3,905,280 | 9/1975 | Egleston et al. | 156/580.1 |
| 3,956,046 | 5/1976 | Tsuchiya et al. | 156/580.1 |

FOREIGN PATENT DOCUMENTS 2165620 5/1974 Fed. Rep. of Germany .

Primary Examiner—Michael G. Wityshyn
Attorney, Agent, or Firm—Reising, Ethington, Barnard, Perry & Brooks

[57] ABSTRACT

A method and apparatus for closing and sealing the end of a container having a tubular body wherein the container and closure portion includes front, rear and side panels each extending axially from the tubular body in the open position of the end closure. Each of the end closure panels may have a sealing strip defined at its outer end by a scored line with the rear panel including a closure flap extending from the outer edge of its sealing strip. The end closure panels are folded to a flat closed position by closing jaws with the sealing strips and closure flap projecting axially from the tubular body, after which the sealing strips are sonically welded together. The closure flap and sealing strips are then folded flat, and the closure flap is welded to the outer surface of the front end closure panel.

10 Claims, 22 Drawing Figures

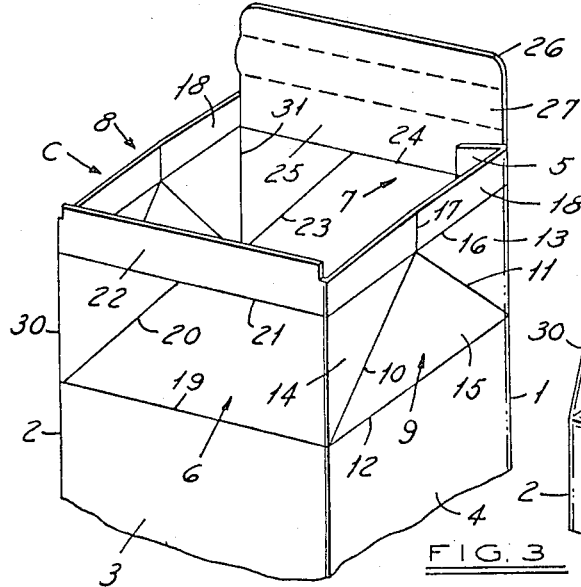
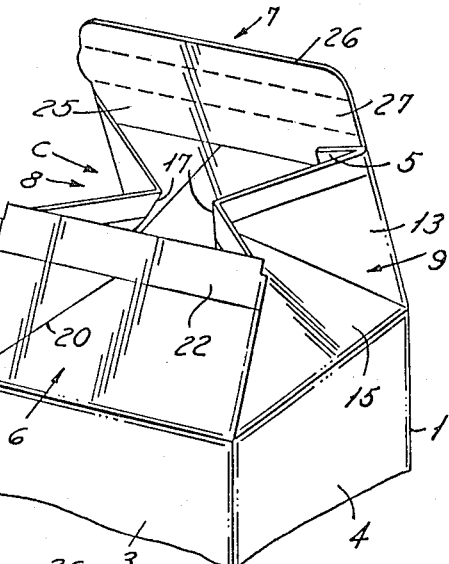
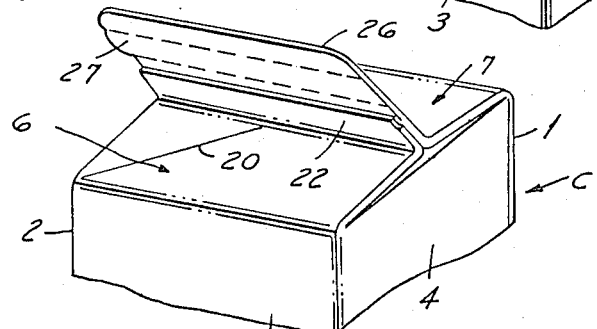
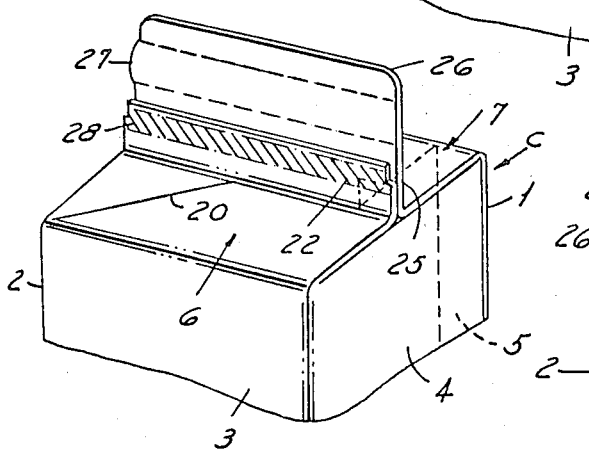

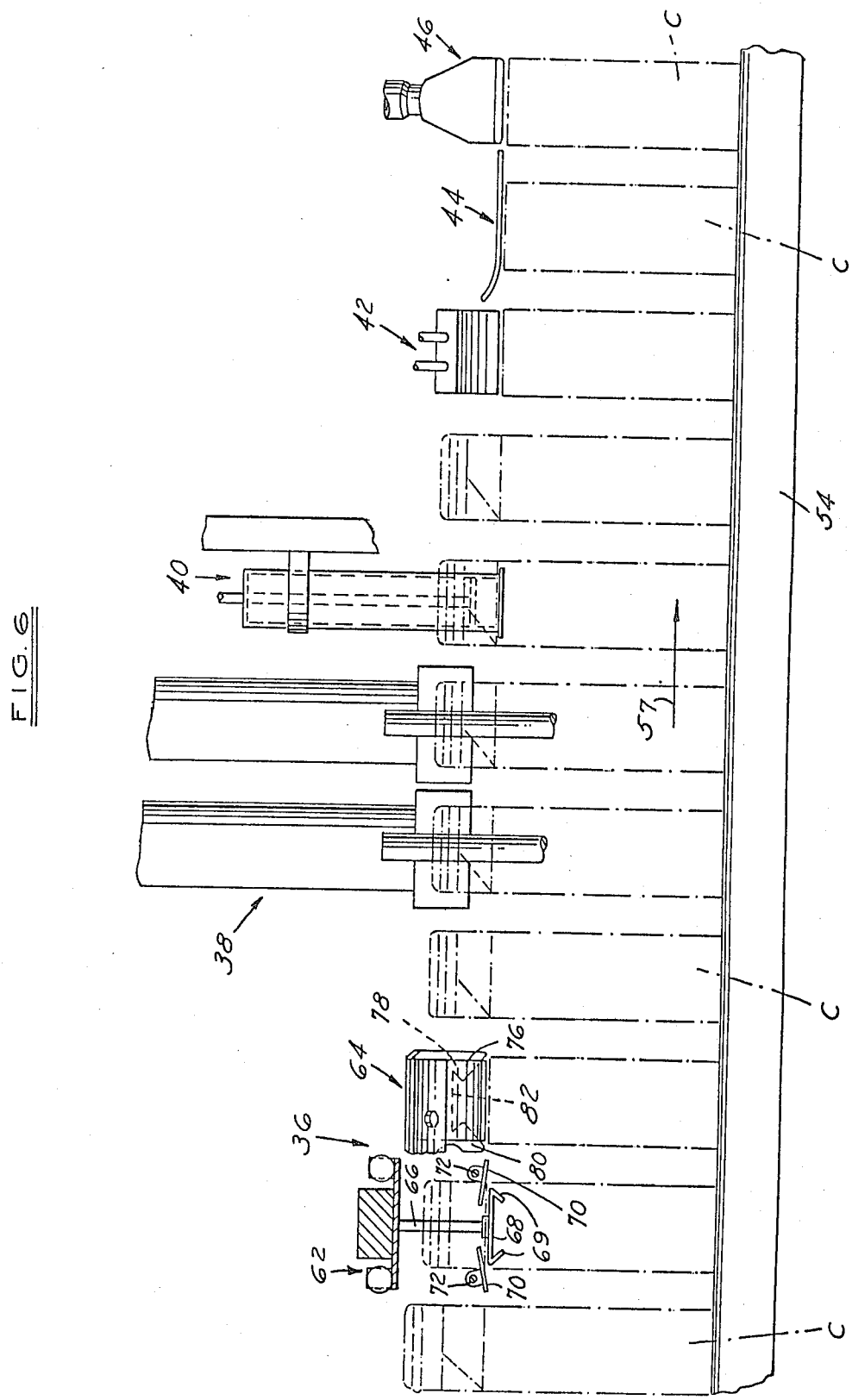

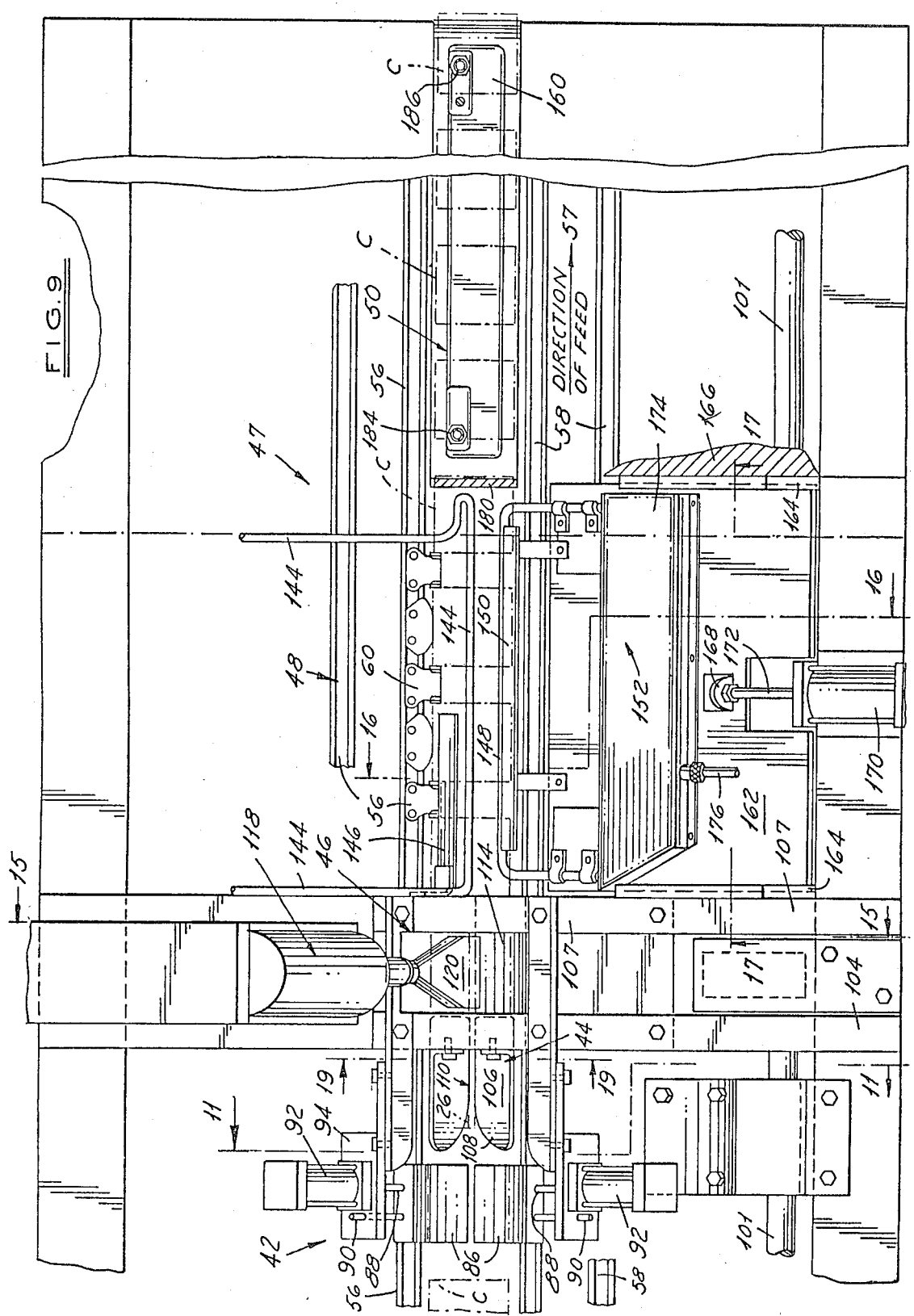

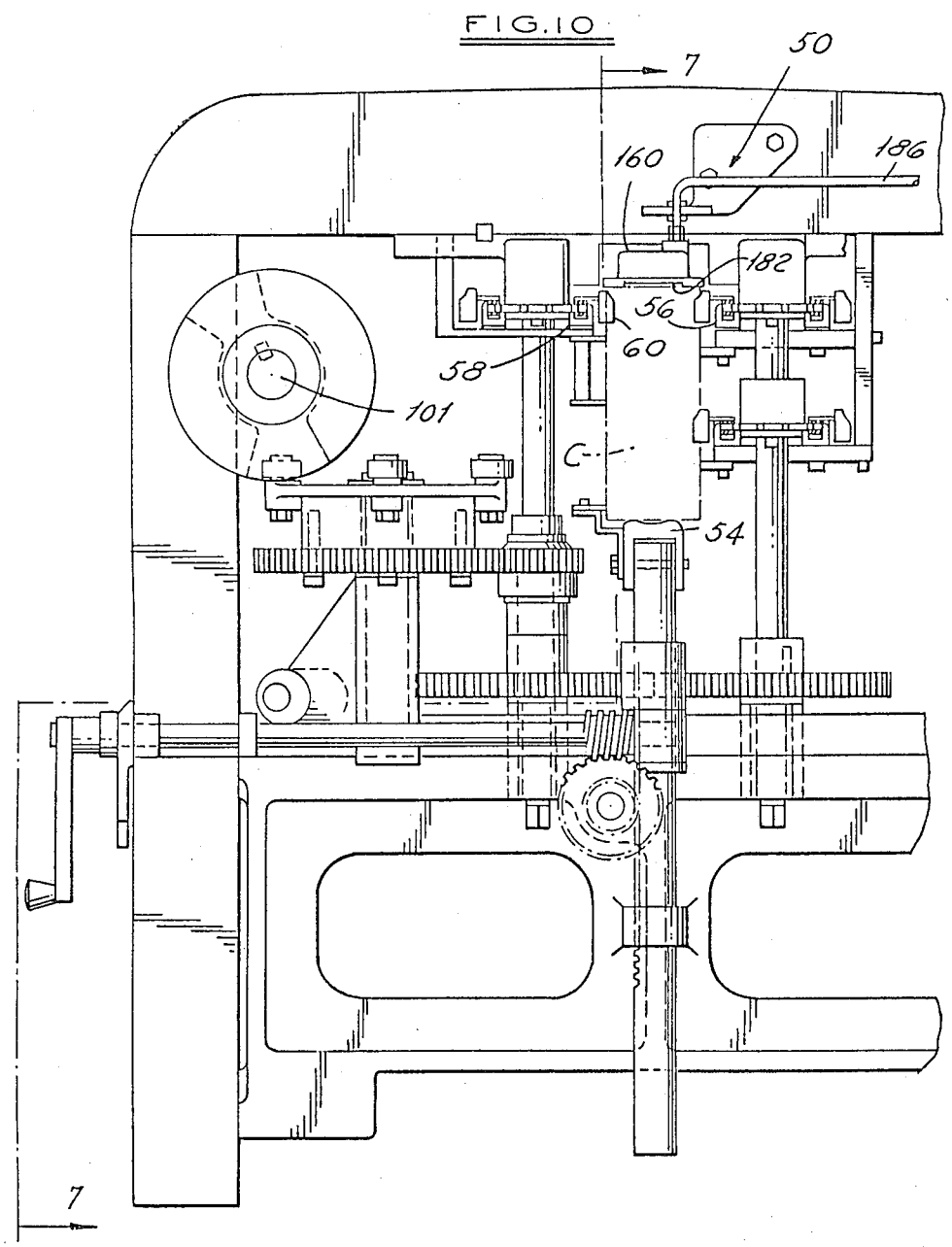

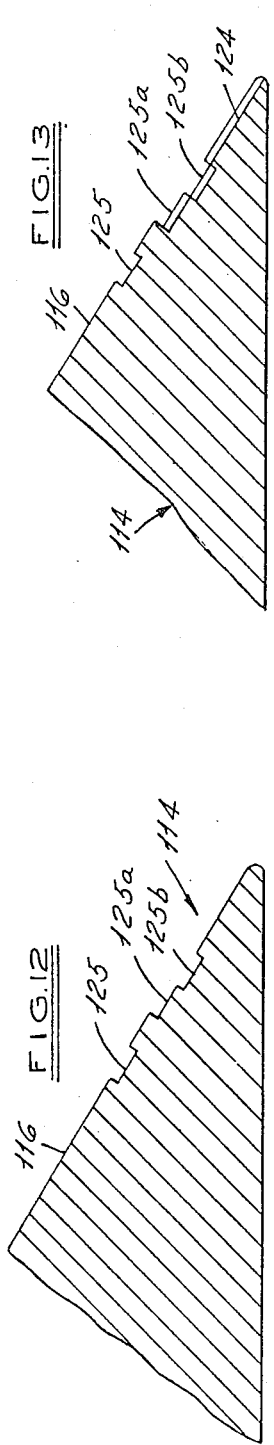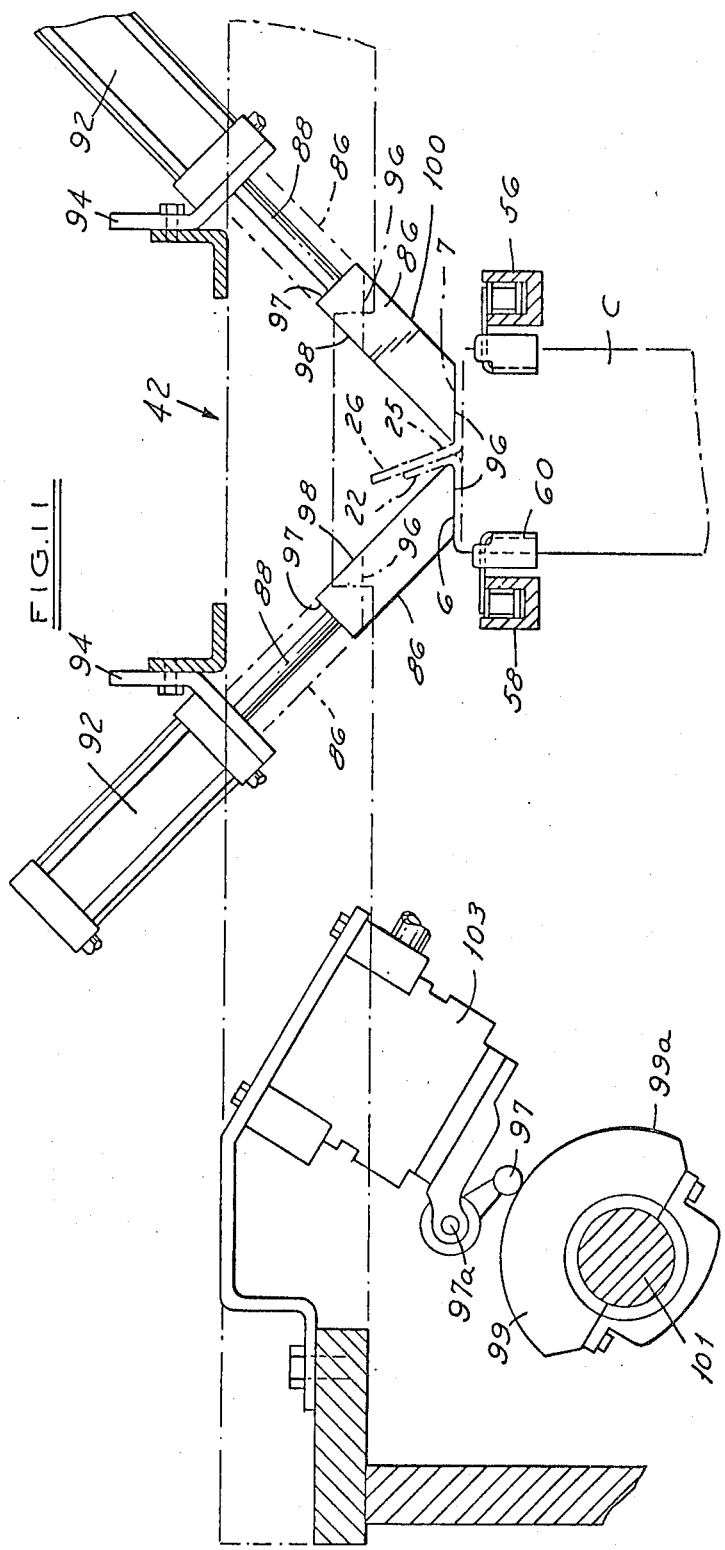

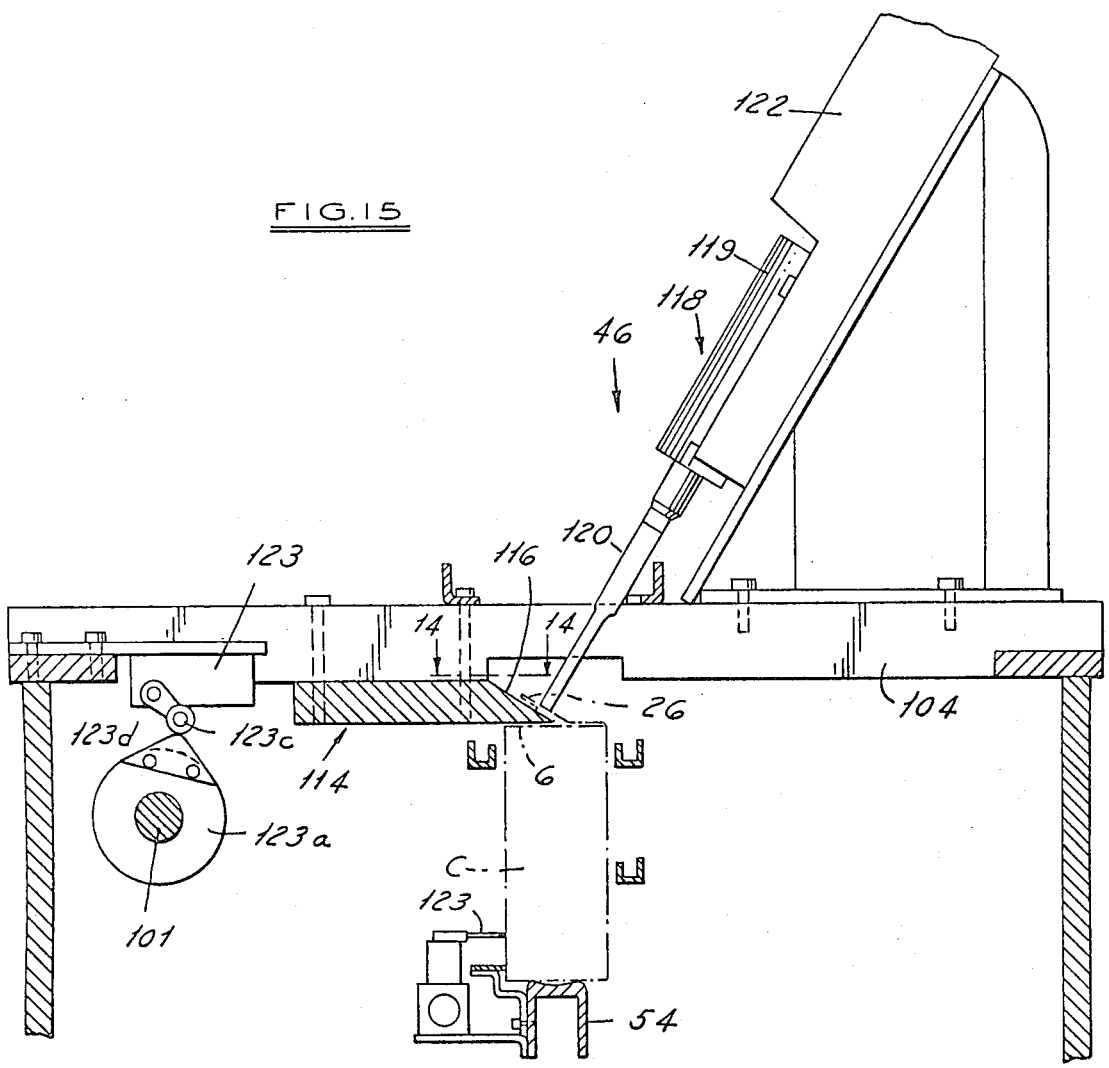
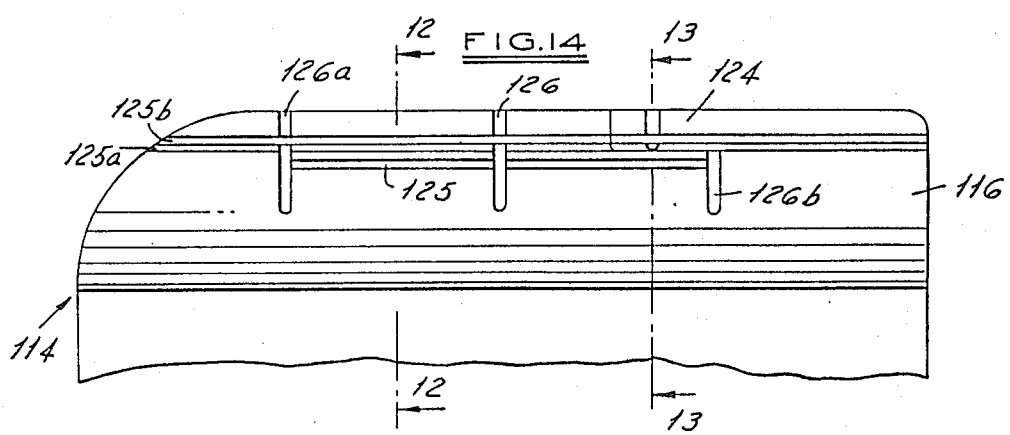

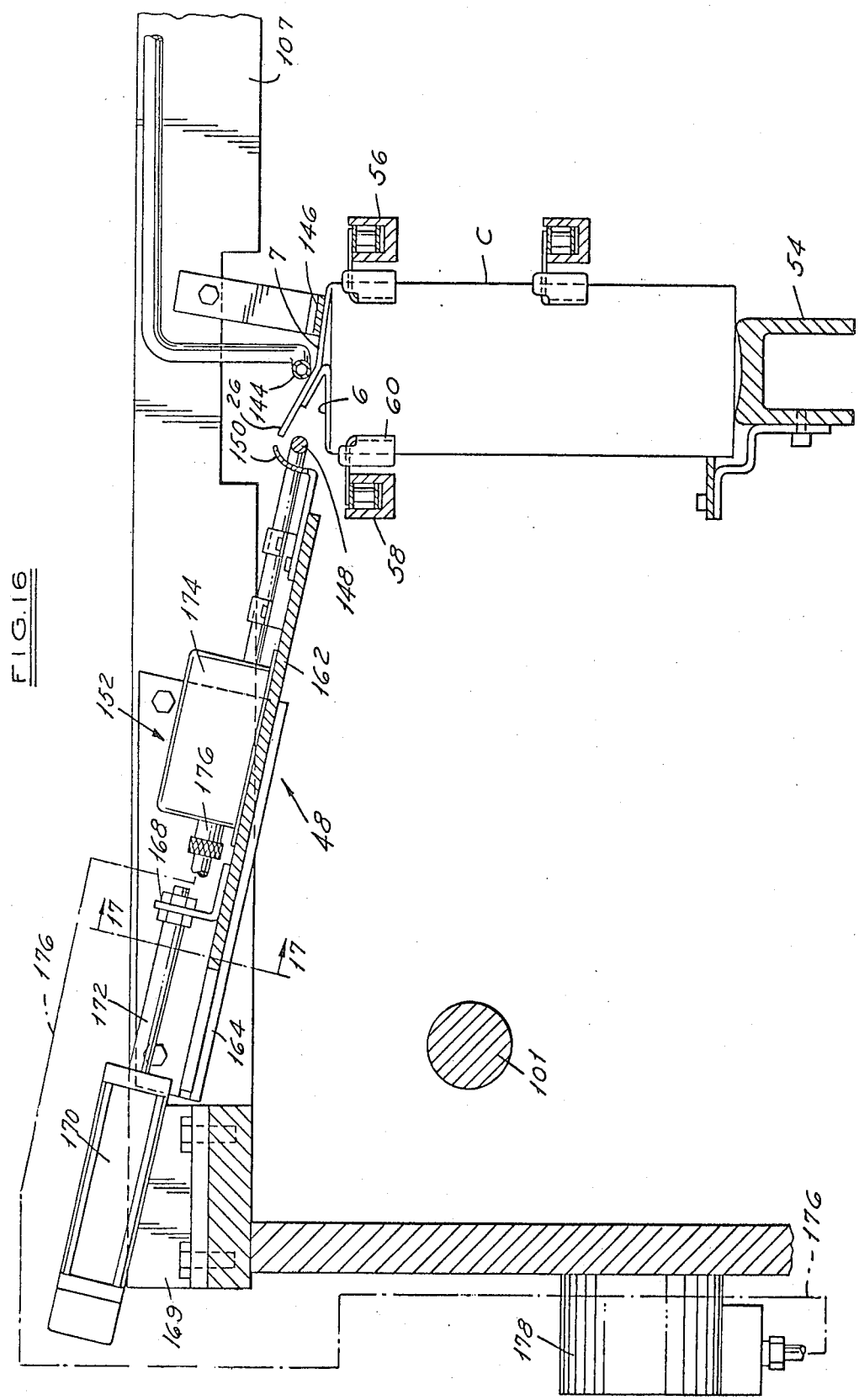

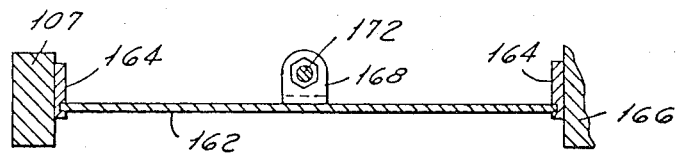
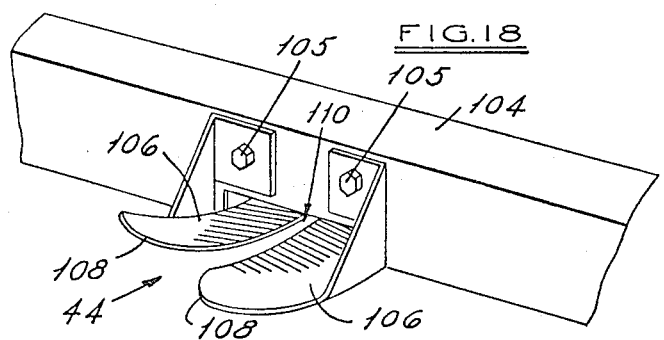
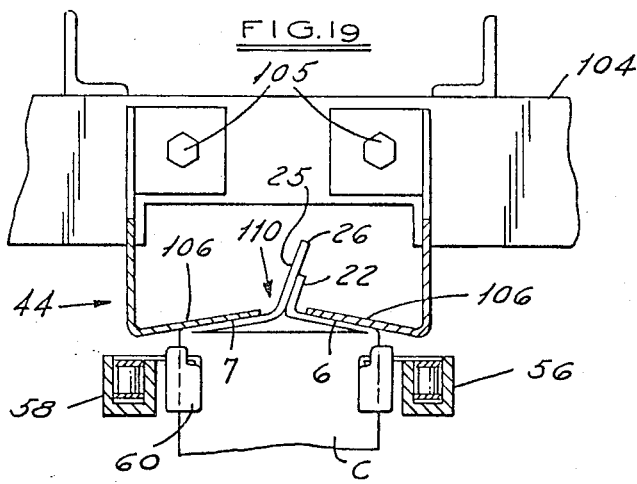
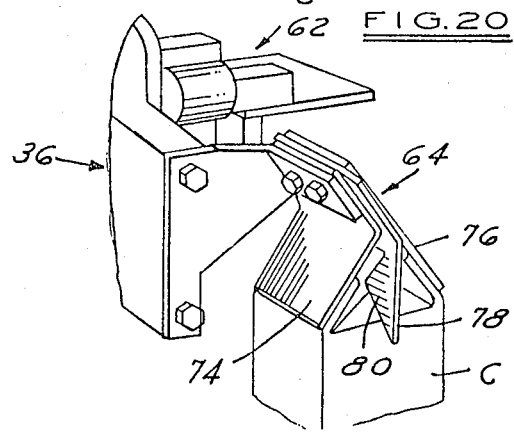

METHOD AND APPARATUS FOR PACKAGING

This is a continuation of Application Ser. No. 780,137, filed Mar. 22, 1977, now abandoned, which is a continuation of application Ser. No. 559,869, filed Mar. 19, 1975, now abandoned, which is a divisional of application Ser. No. 443,594, filed Feb. 19, 1974, now U.S. Pat. No. 3,910,014.

This invention relates generally to packaging methods and apparatus and is particularly, but not exclusively, concerned with methods and apparatus for closing and sealing the ends of containers of thermoplastic or thermoplastic coated material.

One particular type of container that the present invention is concerned with is the type made of paperboard stock coated on both sides with a thermoplastic material such as polyethylene. The polyethylene coating on the paperboard is utilized not only as a moisture-proofing material, but also serves as a heat and pressure sensitive adhesive which cooperates in sealing the closure elements of the container so as to make the container fluid-tight when it is filled with milk or other contents and sealed and closed. An example of this general type of container, and of the general type of apparatus with which the present invention is concerned is disclosed in U.S. Pat. No. 3,120,089.

The conventional manner of sealing such containers is to bring portions of the thermoplastic coated container into contact with each other and, by the application of heat sufficient to melt the thermoplastic coating at the portions to be joined and sealed, to weld the two surfaces together. When the thermoplastic material cools and sets, the two surfaces are sealed and adhesively secured together. In addition to requiring the use of elaborate and expensive apparatus for generating the considerable amount of energy required, elaborate apparatus, methods, and systems are required to dissipate the heat from the plant in which the packaging operation is being carried out. Other examples of this general type of packaging apparatus are shown in U.S. Pat. Nos. 3,002,328; 3,120,089; 3,166,994; 3,187,647; 3,239,995 and 3,309,841.

The type of thermoplastic coated paperboard container most commonly in use is that having a so-called "gabled" top (an example of which is disclosed in U.S. Pat. No. 3,239,995) having, in its closed condition, upwardly inclined panels projecting from the top edges of the sides of the container. The gabled top is designed such that, in order to gain access to the contents of the container, the seal may be broken in a particular manner and the top partially unfolded to form a pouring spout.

A particular problem encountered with gabled top containers is that of shipping large numbers of the containers since it is difficult to stack the containers on top of each other. In order to stack several layers of the containers in an upright position on top of each other, a specially designed shelf or divider having projections on its lower side designed to fit in a complementary relationship with the gabled tops must be placed between each layer of the containers so that the bottoms of the containers making up the next upper layer can be seated on a flat surface. The specially designed shelf or divider, of course, adds to the expense of shipping handling large numbers of the containers. It is thus highly desirable to provide a machine that will produce, on a mass production basis, a container of this type having a top end closure that is flat when closed and sealed, so that the necessity for a specially designed divider between stacked layers of the containers will be eliminated.

One of the objects of the present invention is to provide a method and apparatus for closing and sealing an end closure of thermoplastic coated paperboard containers and the like at a high rate of production with minimum requirements for heat generation and dissipation.

A more specific object is to provide apparatus for folding and sealing a flat top end closure of a container of thermoplastic coated paperboard, or the like, with a sonic welding operation to reduce the amount of heat required for the sealing operation.

A still further object is to provide a method and apparatus for closing and sealing a flat end closure of a container of thermoplastic coated paperboard, or the like.

A still further object is to provide a method and apparatus for closing and sealing the flat top of a container of thermoplastic coated paperboard, or the like, with a sonic welding operation utilizing a minimum amount of heat, and wherein the flat top container has a closure flap that can be easily removed to permit the container top to be opened to form a pouring spout.

The foregoing, and other objects, are achieved in accordance with the present invention by the provision of a method and apparatus for closing and sealing the end closure of a container having a tubular body, of rectangular or other cross-section, the end closure having front, rear and side panels that extend axially from the tubular body when the end closure is in its fully open position. In accordance with the invention, the end closure is folded by closing means to a closed position with the front and rear panels lying substantially flat and transversely of the tubular body with the side panels collapsed beneath the front and rear panels, and with sealing strips and a closure flap on the panels projecting axially outwardly from the container body. The sealing strips are then welded together to seal the end of the container and secure the end closure in its closed condition. After the sealing strips are welded together, the closure flap is heated and it, together with sealing strips, are folded flat to overlie one of the flat front or rear panels, and the closure flap is adhesively secured thereto.

The apparatus for carrying out the closing and sealing operation includes a conveyor for conveying the containers sequentially through a closing station, a welding station, and a closure flap heating, folding and welding station. A pair of opposed closing jaws are located at the closing station which are movable toward each other from retracted positions spaced from each other to extended positions when a container is located between the jaws to fold the open end closure panels to the closed condition. An anvil and sonic welding device is located at the welding station. When a container moves to the welding station from the closing station, a vibrating horn extends from the sonic welding device and engages one outer surface of the sealing strips while forcing the other outer surface of the sealing strips into engagement with the anvil. The horn vibrates at a frequency sufficient to generate an amount of heat necessary to weld the layers of sealing strips together to seal the end of the container. When the vibrating horn retracts, the container moves to the closure flap heating, folding and welding station where the closure flap is heated and folded flat over the closed top, the heat causing the closure flap to stick to the outer surface of the closed flat panels.

The closure flap may include a tear strip to permit the closure flap and sealing strips to be unfolded so that the seal can be broken by partially separating the sealing strips and forming a pouring spout with one of the collapsed side panels as with a conventional gable-top container.

Other objects, advantages and features of the invention will become apparent from the following description taken in connection with the accompanying drawings in which:

FIG. 1 is a perspective view of a portion of a container of thermoplastic coated paperboard material, or the like, with the container end closure portion in a fully open position;

FIG. 2 is a perspective view of the container of FIG. 1 after a prebreaking operation in which the panels of the end closure portion have been slightly bent inwardly toward the closed position;

FIG. 3 is a perspective view of the container of FIGS. 1 and 2 with the end closure portion in the closed condition with a closure flap and sealing strips projecting generally axially from the closed end prior to the sealing operation;

FIG. 4 is a perspective view of the container after the sealing strips have been sealed together by sonic welding;

FIG. 5 is a view of the container with the closure flap folded flat and adhered to the top of the container;

FIG. 6 is an elevational view of a portion of apparatus according to the invention for filling, closing and sealing containers of the type illustrated in FIGS. 1 through 5;

FIG. 9 is a plan view of a portion of the apparatus of FIGS. 6 and 7 as viewed approximately along lines 9—9 of FIG. 7;

FIG. 10 is an end view of the apparatus of FIGS. 6 and 7 as viewed along lines 10—10 of FIG. 7;

FIG. 11 is a sectional view taken along lines 11—11 of FIG. 9;

Figure 21:
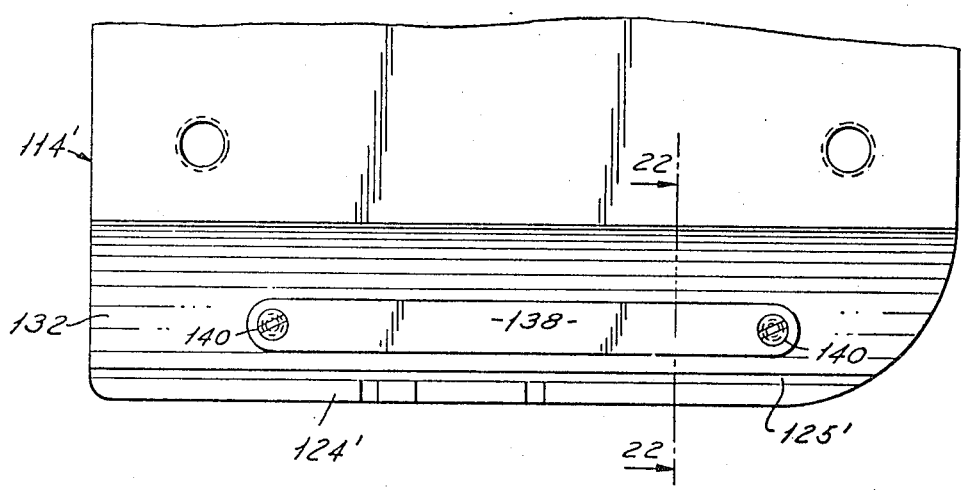

FIGS. 12 and 13 are sectional views taken along lines 12—12 and 13—13, respectively, of FIG. 14;

FIG. 14 is a plan view of a portion of an anvil used in the welding operation as viewed along lines 14—14 of FIG. 15;

FIG. 15 is a view of the sonic welding apparatus taken along lines 15—15 of FIG. 9;

FIG. 16 is a sectional view taken along lines 16—16 of FIG. 9;

FIG. 17 is a sectional view taken along lines 17—17 of FIG. 16;

FIG. 18 is a perspective view of hold-down bars or guide members for holding the container end closure panels in the closed position as the container moves from the closing station of FIG. 11 to the sonic welding apparatus;

FIG. 19 is a sectional view of the guide members shown in FIG. 18 taken along lines 19—19 of FIG. 9;

FIG. 20 is a perspective view of a portion of the top breaking mechanism;

FIG. 21 is a plan view of a second, preferred form of sonic welding anvil; and

Figure 22:
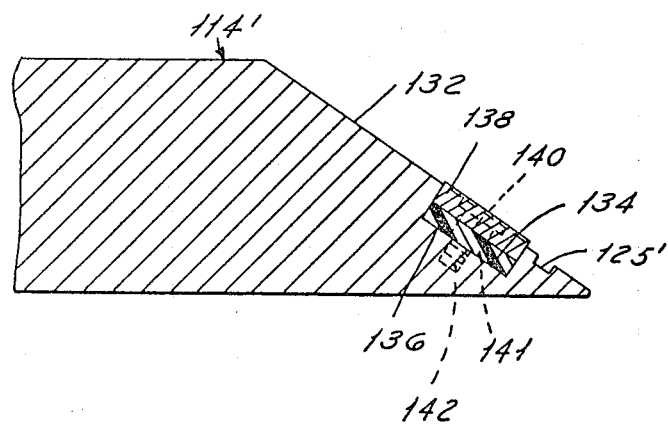

FIG. 22 is a sectional view of the anvil of FIG. 21 taken along lines 22—22 of FIG. 21.

With reference first to FIGS. 1 through 5, a container is designated collectively by reference character C. The container C is provided with a thermoplastic coating, and may be made of paperboard, or the like, coated with thermoplastic material such as polyethylene. The container C is made from a blank of the thermoplastic coated paperboard and may be erected from the blank into the form shown in FIG. 1 by prior art machinery of the type disclosed in the patents referred to above. The body of the container C is of tubular configuration having a rectangular cross-section with four body side panels indicated by reference numerals 1, 2, 3 and 4 with a sealing flap or panel indicated by reference numeral 5. The flap 5 is bent inwardly from the side panel 4 and sealed to the inner surface of the side panel 1.

The top end closure portion of the container C is shown in its fully open position in FIG. 1 and includes front, rear and side end closure panels 6, 7, 8 and 9, respectively. In the fully open position of FIG. 1, the end closure panels 6, 7, 8 and 9 project axially from the tubular body of the container. The side panels 8 and 9 are formed into three triangular segments 13, 14 and 15 by scored lines 10, 11 and 12. The triangular segment 15 constitutes a central segment with one side extending along the scored line 12 at the upper end of the respective side panel of the body of the container. A sealing strip or rib 18 is provided at the upper end of the side panel 9 and is separated from the triangular segments by a scored line 16. The center of the sealing strip 18 is provided with a scored line 17 to define an inwardly projecting corner for overlapping engagment with the corresponding corner 17 of the side panel 8 when the top closure portion is folded and sealed to its closed position as is described in greater detail below.

The front panel 6 has a scored line 20 defining a triangular segment adjacent to the side panel 8 which cooperates therewith to define a pouring spout when the container is opened after being filled.

The lower edge of the front end closure panel 6 is connected with the body panel 3 by a scored line 19, and the upper edge of the front panel has projecting therefrom a sealing strip 22, the lower edge of which is defined by a scored line 21.

The rear end closure 7 has a scored line 23 corresponding to the scored line 20 on the front panel 6 to define a triangular segment adjacent to the side closure panel 8. The rear closure panel 7 also has a sealing strip 25 projecting from a scored line 24 at the upper edge of the rear closure panel 7. Projecting upwardly from the sealing strip 25 is a closure flap 26 formed intermediate its ends with a tear strip 27. The tear strip 27 is defined between two lines of a series of perforations.

When the container C has been erected from the blank with the end closure portion in the fully open position illustrated in FIG. 1, in which it extends axially from the tubular body of the container, the closure portion can be closed, sealed and folded to the position shown in FIG. 5 in which the end of the container is flat with the front and rear closure panels 6 and 7, respectively, lying flat across the end of the container with the closure flap 26 adhered to and overlying the front panel 6. When the tear strip 27 is removed, the edges 30 and 31 of the closure portion can be pushed upwardly to break the seal 28, and the triangular segments 13, 14 and 15 of the side panel 8, in cooperation with the triangular segments defined by the scored lines 20 and 23 on the front and rear panels 6 and 7, respectively, will define a pouring spout.

The method by which the top, closure portion of the container C is closed from the open position of FIG. 1 to the closed position of FIG. 5 comprises first a "prebreaking" step, by which is meant that the side panels 7 and 8 are bent slightly inwardly to initially bend the triangular segments along the scored lines 10, 11, 12 and 17 so that the side panels will collapse inwardly as the front and rear panels are moved toward each other. The prebreaking operation may take place either prior to or subsequent to filling the container with milk or other contents. After the prebreaking step, the front and rear closure panels 6 and 7 are bent toward each other as shown in FIG. 2 to cause the side panels 8 and 9 to collapse inwardly beneath the front and rear panels 6 and 7. The closing operation continues until the lower edges of the sealing strips 18, 22 and 25 along the scored lines 16, 21 and 24 are brought together such that the front and rear panels 6 and 7 lie substantially flat across the end of the container as shown in FIG. 3. With the panels in the position shown in FIG. 3, the sealing strips are sonically welded together along the band indicated by the shaded area 28 in FIGS. 4 and 5. Following the sonic welding step, the closure flap 26 is heated on its outer end on the surface adjacent to the front panel 6, after which the closure flap, together with the sealing strips 18, 22 and 25, are folded downwardly until the closure flap 26 assumes the position shown in FIG. 5. The closure flap 26 is heated on its outer end, that its, the end opposite the sealing strip so that the tear strip 27 preferably is not adhered to the front panel 6.

Figure 7:
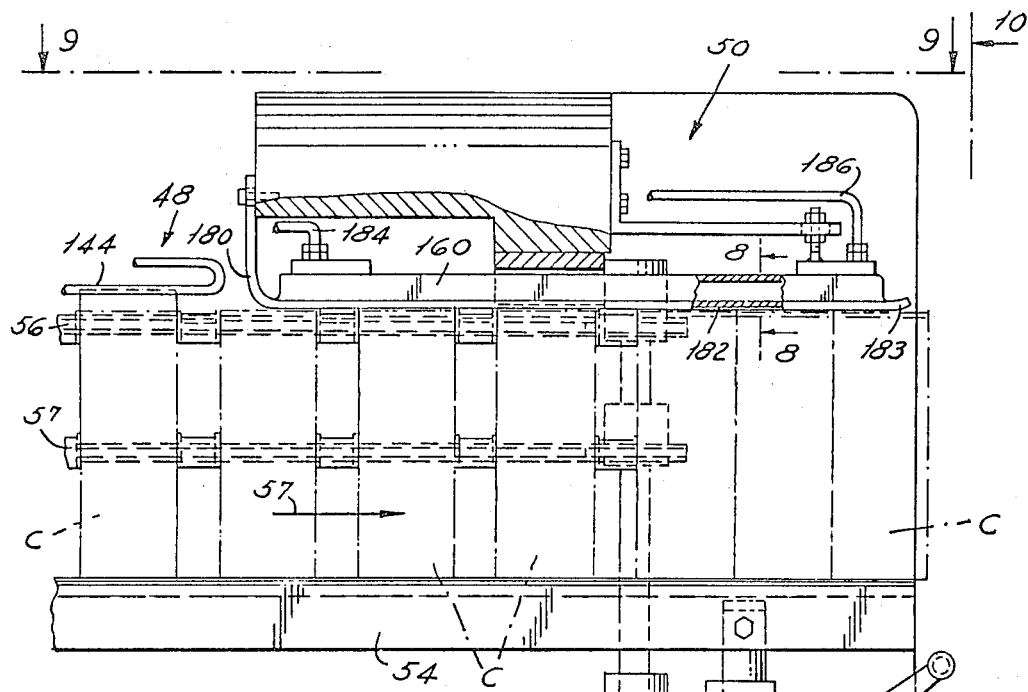
FIG. 7 is an elevational view of another portion of the apparatus of FIG. 6 as viewed along lines 7—7 of FIG. 10.
Figure 8:
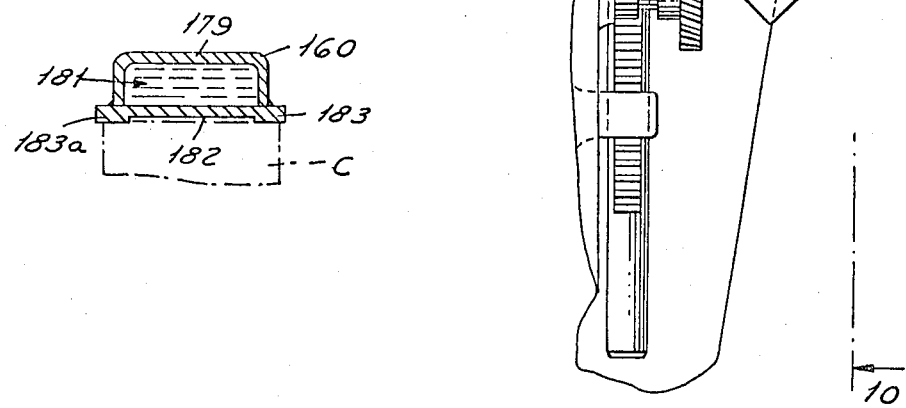
FIG. 8 is a sectional view taken on lines 8—8 of FIG. 7.

The apparatus for filling, closing and sealing the top of the container illustrated in FIGS. 1 through 5 is shown in FIGS. 6 through 10, with various details and components being illustrated in the remaining FIGURES of the drawings. With reference to FIGS. 6 and 7, reference numeral 36 collectively designates conventional prebreak mechanism which is operable to initially bend the end closure panels 5, 6, 7 and 8 inwardly toward their closed position to induce a certain amount of permanent set in the scored lines separating the panels from the container body side panels 1, 2, 3 and 4. Reference numeral 38 collectively designates filler apparatus for filling the containers after the prebreaking operation with milk or other material as the containers move along the production line. Reference numeral 40 collectively designates a conventional defoamer or skimming apparatus for removing foam from the top of the milk or other liquid contents of the container.

Reference numeral 42 collectively designates the closing station wherein the end closure panels are moved to a closed position such that the top of the container is closed with the front and rear panels 6 and 7 lying flat over the upper end of the container with the sealing strips 18, 22, 25 and closure flap 26 projecting axially outwardly from the closed end of the container body. Reference numeral 44 designates hold-down members or guide bars for holding the end closure of the container in its closed position as the container moves to the welding and sealing station indicated by reference numeral 46.

After the container has been welded and sealed as indicated in FIG. 4 at the welding station 46, it is carried to a closure flap folding and welding station 47 including a heating station 48 wherein the surface of the closure flap near the outer end is heated, and a folding and cooling station 50 wherein the closure flap 26 is folded downwardly to the position shown in FIG. 5 to adhere the closure flap to the top surface of panel 6. The top of the container is then substantially flat, and the container moves beneath a cooling bar 160 to remove the heat from the container top induced therein by the heating element 48.

The containers C are indicated in phantom lines in FIGS. 6 through 10 and are moved along an elongated support member 54 by conveyor chains 56 and 58 each having fingers 60 mounted along their lengths for engaging the containers C. The elongated support member 54 may be adjustable in height to accommodate containers having different heights by conventional mechanism indicated generally by reference numeral 55 in FIG. 7. The conveyor chains 56 may be of the same construction as that disclosd in the above referred to U.S. Pat. Nos. 3,239,995 and 3,002,328, for example. The conveyor chains 56 move the container C in the direction of arrows 57 in FIGS. 6, 7 and 9. The specific details of the conveying mechanism form no part of the present invention, and various types of conveying means may be employed in the apparatus for moving the containers through the various stations.

The top breaking assembly 36, as shown in FIG. 6, includes side panel tucking mechanism indicated collectively by reference numeral 62. The tucking mechanism is vertically reciprocable between the lowered, operable position illustrated in FIG. 6, and an upper, inoperable position in which the tucking mechanism is spaced above the top of the container.

The tucking mechanism includes an anvil 68 having inwardly inclined flanges 69 which, in the operable position shown in FIG. 6, are located adjacent to the score lines at the top of the body panels 1, 2, 3 and 4 of the container C. When the anvil 68 is lowered into the open end of the container, triangular fingers 70 are caused to rotate about their shafts 72 to engage the triangular segments 15 and bend the side panels 8 and 9 inwardly as shown in FIG. 2. When the side panels are tucked inwardly between the front and rear panels 6 and 7, respectively, the anvil 68 is withdrawn and the left-hand finger 70 rotates in a counterclockwise direction about its shaft 72 and the right-hand finger 70 is rotated in a clockwise direction about its shaft 72 as the tucking mechanism is raised to its inoperative position spaced above the top closure portion of the container C.

The top breaking mechanism also includes front and rear panel breaking mechanism indicated collectively by reference numeral 64. With reference to FIGS. 6 and 20, the mechanism 64 includes an assembly of plates 74, 76 and 78, the plate 78 being sandwiched between the plates 74 and 76 and having inwardly projecting triangular segments 80 formed thereon for further urging the side panels 8 and 9 of the top closure portion of the container inwardly as shown in FIG. 2. The inclined plate 74 overlies the rear panel 7 and the inclined plate 76 overlies the front panel 6 to cause the panels 6 and 7 to move toward each other with the closure flap 26 extending into the space 82 between the triangular segments 80 of the plate 78. The unit 64 of the top breaker unit is mounted integrally with the side tucking unit 62 so that it is raised and lowered to the inoperable and operable positions, respectively, with the side tucking unit 62. Thus, when the side tucking unit 62 is in the operable position with a container C located at the side tucking station, the unit 64 is in an operable position with the preceding container C so that each container C receives a top breaking operation from the side tucking unit 62 and the front and rear panel breaking unit 64.

The conveyor chains 58 move the containers step by step along the elongated support member 54 from station to station where each operation is performed. After the top breaking operation is performed at the top breaking station 36, the containers move to the filler station 38 where a filler tube is lowered into the open end of the container (the end being in the prebreak condition illustrated approximately in FIG. 2) and the container is filled with milk or other contents. The container then moves to the skimmer or defoaming station 40 where a conventional defoaming apparatus is lowered into the container to suck away the foam on the top of the milk or other liquid contents of the container and carry it to a container located at a remote position from the conveying assembly. After the container has been filled and defoamed, it is conveyed to the closing station 42.

With reference primarily to FIGS. 9 and 11, the closing station 42 includes a pair of reciprocating closing jaws 86 mounted in opposed relationship with respect to each other. The upper end of each of the closing jaws 86 is connected to the lower end of a piston rod 88 reciprocable in a hydraulic cylinder 92 mounted on a support bracket 94. A guide rod 90 extends from the upper end of each of the jaws 86 through an aperture in the support bracket 94 (FIG. 9). The jaws 86 are reciprocable between the extended position indicated in full lines in FIG. 11 and the retracted position shown approximately in phantom lines in FIG. 11. The closing jaws 86 move in a path extending at an acute angle with respect to the longitudinal axis of the tubular body of the container C. The lower or outer end surfaces 96 of the jaws 86 are consequently inclined with respect to the upper ends 97 such that the upper surface 98 of each of the jaws has a greater length than the lower surface 100—the jaws being of trapezoidal configuration as viewed in FIG. 11. Consequently, since the jaws 86 are reciprocable in opposed, inclined paths with respect to a container C located at the closing station, the lower ends 96, in the extended position, lie in a plane normal to the axis of the tubular body of the container and will force the respective front and rear panels 6 and 7 to the flattened position illustrated in FIG. 42 in which the front and rear panels 6 and 7 of the container C extend at substantially right angles to the body side panels of the container to overlie the upper end of the container body.

Fluid flow to and from the cylinders 92 is controlled by a cam follower 97 engaged with the surface of a cam 99 fixed to a rotating shaft 101. As the cam 99 rotates with the shaft 101, the cam follower 97 pivots about the axis of a pin 97a as it follows the surface of the cam to actuate a control device 103. When the cam 99 and cam follower 97 are in the position shown in FIG. 11, the control device 103 causes pneumatic fluid to flow in a direction to cause the jaws 86 to extend from the positions spaced from each other as indicated in phantom lines in FIG. 11 to the extended position indicated in full lines in FIG. 11.

As pointed out previously, the containers C are moved along the support member 54 step by step such that each container has a dwell period in each position. The shaft 101, and hence cam 99, rotate in timed relationship with the conveyor such that each time the conveyor indexes to advance a container C into the closing station 42 between the jaws 86 in their retracted, phantom line positions of FIG. 11, the follower 97 is engaged by surface 99a of the cam to cause the jaws to be actuated toward each other to the extended, full line positions of FIG. 11. When the conveyor again indexes to move the closed container from the closing station 42, surface 99a has moved past the cam follower 97a, which in turn causes the cam follower to pivot clockwise about pin 97a and actuate the jaws 86 to return to the retracted positions to permit the following open ended container C to move into the closing station between the retracted jaws 86.

When the closing jaws 86 are extended to the full line position shown in FIG. 11, the jaws engage panels 6 and 7 and close the end of the container C by folding the front and rear panels 6 and 7 to the positions shown in FIG. 11 and bringing the lower edges of the sealing strips 22 and 25 at the score lines 21 and 24 together. The sealing strips 22 and 25, as well as the closure flap 26, project upwardly from the flattened front and rear panels 6 and 7.

As the container C moves from the closing station 42, the front and rear panels 6 and 7 engage the spaced hold-down members or guide bars 44 to maintain the closure portion in the closed position of FIG. 11. As shown in FIGS. 9 and 18, the guide bar assembly 44 is mounted on a cross-frame member 104 and includes a pair of spaced, flat guide plates 106 secured by conventional fasteners 105 to the cross-frame member 104. The inner edges of the guide bars or plates 106 are flared outwardly at their entrance ends and merge into parallel relationship to define a slot 110 for receiving the upwardly projecting sealing strips 22, 25 and closure flap 26. The guide plates 106 overlie the front and rear panels 6 and 7 of the container C to hold the front and rear panels in the flattened, closed position shown in FIG. 11 until the container is advanced by the conveyor chains 56, 58 to the welding station 46. The outer ends of the guide plates 106, that is the ends remote from the cross-frame member 104, are curved slightly upwardly so that the panels 6 and 7 will engage the underside of the plates 106 even if there is a tendency for the panels 6 and 7 to spring upwardly from the position shown in FIG. 11 after being disengaged by the closing jaws 86. As the containers advance along the guide plates 106, the panels 6 and 7 of the container are held toward the closed position by the guide plates 106 shown in FIG. 19. The sealing strips 22, 25 as well as the closure flap 26 project upwardly through the slot 110 as shown in FIG. 19.

As a container C is advanced by the conveying chains 56, 58 from the guide members 106 of the guide assembly 44, the panel 6 of the container engages the underneath surface of an anvil 114 located at the welding station 46 (FIG. 15). The anvil 114 has an upper inclined support surface 116 for supporting the sealing strip 22, 25 and closure flap 26 for a sonic welding operation. The anvil 114 is supported between the cross-frame members 104 and 107 (FIG. 9).

Also supported on the cross-frame members 104 and 107 at the welding station 46 is a sonic welding device which may be an ultrasonic transducer of the type disclosed in U.S. Pat. No. 3,526,792. The sonic welding device, indicated collectively by reference numeral 118, is mounted on a supporting structure 122 which in turn is supported on the cross-frame members 104 and 107. The sonic welding device 118, in the illustrated embodiment of FIG. 15, includes a housing 119 for a converter for converting electrical energy into mechanical energy, and a concentrating horn 120 for concentrating the mechanical energy into vibrations at a desired frequency.

The concentrating horn 120 is shown in its extended operable position for engaging the outer surface of the sealing strip 25 of the carton C located at the welding station, the support surface 116 of the mandrel 114 engaging the outer surface of the sealing strip 22 and serving as a back-up means for the vibrating horn 120. The horn 120 is movable from its extended, operable position to a retracted inoperable position with respect to the support surface 116 when a carton C is not located at the welding station 46. The horn 120 is actuated to move to the extended position shown in FIG. 15 by the engagement of a carton C with a limit switch actuator 123. When the carton is disengaged from the limit switch actuator 123, the horn 120 retracts upwardly from the position shown in FIG. 15.

The shape and configuration of the horn 120 is determined in accordance with the desired frequency of the vibration to produce the desired amount of concentrated, frictional heat at the area to be welded together, namely, the shaded area indicated by reference numeral 28 in FIG. 4. The layers of the carton material between the sealing strips 22 and 25 are welded together by the frictional heat generated by the vibrating horn 120 so that the strips 22, 18, 25, and that portion of the side sealing flap 5 engaged with the sealing strip 25 (FIG. 1) are welded together along the band 28 of FIGS. 4 and 5. As pointed out in greater detail below, the configuration of the support surface 116 is such that a substantially uniform pressure is applied by the horn 120 to the closure portion during the sonic welding operation to accommodate the variations in the thickness along the band 28.

In the preferred form to date, the horn 120 is designed to vibrate at a frequency of 20,000 cycles per second when it is in engagement with the outer surface of the sealing strip 25 of the top closure portion of the carton. The vibration of the horn 120 is converted to frictional heat which melts the thermoplastic coating of the layers of the panels between the sealing strips 22 and 25 to weld the various layers together along the band 28.

When the top of the container is in the closed position illustrated in FIGS. 3 and 4, the tips defined by the scored lines 17 on the sealing strips 18 overlap to assure a complete closure of the space between the strips 22 and 25. Consequently, the thickness of the welded area along the band 28 is increased at substantially its midpoint where the tips 17 overlap. Furthermore, the sealing flap 5 provides an extra thickness at the edge of the band 28. To accommodate for the extra thickness provided by the sealing flap 5, the support portion 116 of the anvil 114 is provided with a recessed portion 124, and a centrally disposed groove 126 is provided for accommodating the extra thickness of the overlapping tips 17. Grooves 126a and 126b may be provided for receiving the outer edges of sealing strips and layers to be welded together. Longitudinal grooves 125, 125a and 125b are also formed in the surface 116 of the anvil 114 to assure that the heated thermoplastic material will flow into and fill all spaces between the layers sandwiched between the surface 116 and the end of the horn 120 to assure a complete seal along the band 28 of FIGS. 4 and 5. Consequently, when the end of the horn 120 engages the sealing strip 25 along the band 28, the groove 126 and recess 124 accommodates the variations in thickness along the band 28 so that a substantially uniform pressure is applied to the material of the carton along the band 28 by the vibrating horn 120. As pointed out previously, the mechanical energy of the vibrating horn is converted into frictional heat to melt the thermoplastic coating of all of the layers sandwiched between the sealing strips 22 and 25 so that a completely sealed joint is provided between the sealing strips 22 and 25. The sealing strips are welded together in such a manner that the front and rear panels 6 and 7 lie substantially flat over the top of the container body.

With the horn 120 designed to vibrate at a frequency of 20,000 cycles per second (or 20 HZ), sufficient heat is generated in a matter of microseconds to melt the thermoplastic and weld the layers located between the horn 120 and anvil surface 116 together, with the heat dissipated into the paperboard of the container. The heat is concentrated along the band 28 (FIGS. 4 and 5) and is quickly dissipated to eliminate the necessity for elaborate heat removal systems.

When a carton C engages the actuator 123, a timing sequence is started by a cam 123a. A control device 125 for the sonic welding device 118 is actuated by a cam follower 123c which is fixed to a pin or shaft 123d. When a carton C engages actuator 123, rotation of the cam 123a causes the cam follower 123c to rock about the axis of its shaft 123d and energize and deenergize the control device 125 to, in turn, control the operation of the sonic welding device 118. Thus, when a carton C engages the actuator 123, the rotation of cam 123a, because of the resulting movement of the follower 123c, causes the control device 125 to actuate the horn 120 to sequentially (1) extend into the position shown in FIG. 15 from its retracted position, (2) vibrate for a predetermined period of time, (3) stop vibrating and remain in the extended position shown in FIG. 15 for a predetermined period of time, and (4) return upwardly to its retracted position as the cam 123c completes a full revolution. The amount of time involved in the entire sequence is the same amount of time involved for the conveyor chains to index a carton C from one position to the next along the support member 54 in the direction of arrows 57.

With the horn 120 designed to vibrate at a frequency of 20,000 cycles per second, for each welding operation on the thermoplastic coated paperboard containers C illustrated, a vibration time of from about 0.2 to 0.5 seconds will be required to cause the thermoplastic to flow. Following the vibration time of from 0.2 to 0.5 seconds, the horn 120 is held in contact with the layers 18, 22, 25 for a period of from about 0.5 to 1.5 seconds to allow the thermoplastic material to cool and set to complete the seal along the band 28. The cooling time may be accelerated by circulating cooling fluid through the anvil 114 to cool the surface 116. The foregoing specific figures regarding the vibrating frequency and time, as well as the setting time of the thermoplastic material, are given by way of example only, and may vary depending upon the area to be welded together, the thickness and number of layers to be welded together, the specific properties of the thermoplastic material, and the amount of cooling provided in the anvil 114.

FIGS. 21 and 22 illustrate an alternative, preferred embodiment of an anvil for cooperation with the horn 120 of the sonic welding device 118. Reference numeral 114' collectively designates the anvil of FIGS. 21 and 22, and reference numeral 132 designates the inclined, support portion of the anvil. Formed in the support portion 132 is an elongated groove 134. Received in the groove 134 is a strip 136 of resilient elastomeric material, such as elastomeric urethane. An elongated plate member 138, corresponding in shape to the groove 134 and resilient strip 136, is received in the groove 134 and is supported on the upper surface of the resilient strip 136. In the unstressed condition of the resilient strip 136, the outer surface of the plate 138 projects above the surface 132 for a distance of, for example, 0.015 inches.

The plate member 138 is secured to the anvil 114′ by screws 140 having a shank with an enlarged, unthreaded portion 141 and a threaded portion 142. The unthreaded portion 141 is enlarged with respect to the threaded portion 142 to define a shoulder which seats against the bottom of the groove 134 and is received in aligned apertures in the plate member 138 and resilient strip 136. The head of the screw 140 is enlarged with respect to the unthreaded portion 141 of the shank to prevent separation of the plate member 138 from the anvil. However, the plate member 138 can be compressed inwardly toward the bottom of the groove 134 due to the resilient support provided by the strip 136. An elongated groove 125′ is formed in the inclined support surface 132 beneath the groove 134, and the anvil 114′ is also provided with a recessed portion 124′ to accommodate the extra thickness provided by the side sealing flap 5 at its connection with the sealing strip 25 (FIGS. 1 and 4).

When the anvil of FIGS. 21 and 22 is mounted in the position of anvil 114 as shown in FIG. 15, the portion of the sealing strip 22 encompassed by the band 28 of FIGS. 4 and 5 engages the plate 138 and the horn engages the sealing strip 25 along the band 28 to compress the carton material layers along band 28 between the horn 120 and the plate 138. The resilient strip 136 yields sufficiently in the areas along the band 28 having the greatest thickness to provide a substantial uniform pressure along the end of the vibrating horn 120. The resilient padding permits the plate 138 to float with respect to the bottom of the groove 138 which, in turn, permits the paperboard layers to shift around and cause the thermoplastic material to flow into all of the voids and spaces to provide a complete seal along the band 28. The groove 125′ and recess 124′ assist in accommodating the extra thicknesses of material and minimizing the distortion of the layers as they engage the plate 138. The vibration of the horn 120 in the longitudinal direction causes the hot thermoplastic material, in conjunction with the resilient support of the plate 138, to flow more freely and fill all of the voids between the layers of material along the band 28.

Both of the anvils 114 and 114′ may be provided with passages for circulating water or other cooling fluid or liquid through the anvil to prevent an excessive buildup of temperature at the surface of the anvil engaged by the carton during repeated operation of the welding apparatus 118, 114 and 114′.

Following the completion of the welding operation at the welding station 46, the conveyor advances the container C from the welding station to the area indicated generally by reference numeral 47 in FIG. 9 where the closure flap 26 of the container is heated, folded flat against the front panel 6 and then cooled to adhesively secure the closure flap 26 in the position shown in FIG. 5. As the carton C leaves the welding station, the end closure panel 7 of the carton engages a guide plate 146, and the closure flap 26 engages a guide rod 144 which urges the closure flap toward the left as viewed in FIG. 16 toward a heating bar 148. The heating bar 148 extends beneath a heat shield 150 for reflecting heat in the direction of the lower surface of the closure flap 26 as viewed in FIG. 16. The heating bar 148 constitutes part of a heating assembly 152 that is shown in its operative, extended position in FIG. 16. The heating assembly 152 remains in the operative, extended position, so long as the conveyor chains 56 and 58 are operating to convey the container C along the support member 54 from station to station. However, in the event of a stoppage, the assembly 152, together with the heating bar 148 retracts to the left as viewed in FIG. 16 so as not to apply an excessive amount of heat to cartons moving through the heating station 48 in proximity to the heating bar 148.

The heating assembly 152 is mounted on a platform 162 which is slidably supported in track members 164 mounted on frame members 107 and 166 (FIG. 17). Mounted on the upper surface of the slidable platform 162 is a bracket 168. Mounted on a support member 169 is a hydraulic piston and cylinder assembly including a cylinder 170 secured to the support member 169, and a piston 172 which extends and retracts hydraulically with respect to the cylinder 170. One end of the piston 172 is secured to the bracket 168 so that movement of the rod 172 causes corresponding movement of the platform 162 in the track members 164. The controls for the hydraulic cylinder 170 are interconnected with the conveyor system in such a manner that the piston 172 is actuated to the extended position shown in FIG. 16 when the conveyor is started into operation. When the conveyor stops for any reason, the hydraulic pressure in the cylinder 170 is automatically reversed to retract the piston rod 172 and move the platform 162, together with the heating rod 148 to the left as viewed in FIG. 16 so that the heating rod 148 will be out of proximity with any cartons C located at the heating station 48.

The heating assembly 152 includes a connector housing 174 in which is mounted the resistance heating rod 148 and various electrical connections, the housing 174 being connected through an electrical conductor 176 with a source of electrical power indicated by reference numeral 178 in FIG. 16. As the cartons C move through the heating station 48 along the rod 144, the thermoplastic material on the underneath side of the closure flap 26 adjacent its outer end is heated by the heating rod 148 to a temperature sufficient to cause the thermoplastic material to become tacky or in a plastic state.

As each container is advanced by the conveyor past the right end of the heating bar 148 as viewed in FIG. 9, the closure flap 26 engages the curved end 180 of the bottom plate 183 of the cooling bar 160. The cooling bar 160 includes a substantially U-shaped housing portion 179 mounted on the upper surface of the plate 183 to form a chamber 181 for water or other cooling fluid. As the closure flap 26 engages the end portion 180 of plate 183, it is folded downwardly into engagement with the upper surface of the end closure panel 6 and is held in position against the end panel 6 by the bottom plate member 183. The cooling fluid is circulated through the chamber 181 by pipes 84 and 186 (FIG. 7) and the thermoplastic material heated by the heating bar 148 is caused to set and adhesively secure the closure flap 26 to the panel 6 so that the end closure is in the closed and sealed position illustrated in FIG. 5. The movement of the cartons along the length of the cooling bar 160 removes heat from the end closure, and the bottom plate 183 is recessed as indicated by reference numeral 182 in FIG. 8 so that the maximum pressure is applied at the closure flap 26 by portion 183a (FIG. 8) of the bottom plate 183 to insure that the closure flap 26 will be adhesively secured to panel 6 of the end closure as shown in FIG. 5. The operation is completed as a carton C moves past the right end of the bottom plate 183 as viewed in FIG. 7.

While a specific form of the invention is described in the foregoing specification and illustrated in the accompanying drawings, it should be understood that the invention is not limited to the exact construction shown. To the contrary, various alterations in the construction and arrangement of parts, as well as the sequence of steps, all falling within the scope and spirit of the invention, will be apparent to those skilled in the art.

The embodiments of the invention in which an exclusive property or privilege is claimed are defined as follows:

1. Apparatus for welding together an end closure of a thermoplastic coated paperboard container having a four-sided tubular body of rectangular cross-section wherein the end closure includes front, rear and side panels and a sealing flap each extending from the edge of a respective one of the sides of the container body, each of the panels and sealing flap having a sealing portion that overlaps in a closed position of the end closure with at least one other sealing portion, said apparatus comprising: an anvil having a support surface for engaging one outer surface of the overlapped sealing portions; and vibrating means engageable with the opposite outer surface of the overlapped sealing portions when said one outer surface is engaged with said support surface, said vibrating means being operable to vibrate at a frequency sufficient to generate heat for welding the overlapped sealing portions together along substantially the entire length of said overlapped sealing portions; a portion of said support surface including means for accommodating variations in the thickness of the overlapped sealing portions to minimize variations in pressure applied to the overlapped sealing portions over the areas of the surface engaged by the support means and vibrating means and wherein said last named means comprises grooves and recesses formed in said support surface at locations to be engaged by areas of increased thickness of the overlapped sealing portions including the sealing flap to be welded together.

2. Apparatus for welding together layers of an end closure of a container comprising: an anvil having a support surface for engaging one outer surface of the layers; and vibrating means engageable with the opposite outer surface of the layers when said one outer surface is engaged with said support surface, said vibrating means being operable to vibrate at a frequency sufficient to generate heat for welding the layers together; a portion of said support surface including means for accommodating variations in the thickness of the layers to minimize variations in pressure applied to the layers over the areas of the surface engaged by the support means and vibrating means and wherein said last named means comprises a plate resiliently supported on said support surface for engagement by said one outer surface, said plate being yieldable to accommodate variations in the thickness of the layers to maintain a substantially uniform pressure along the band of the layers between the plate and vibrating means.

3. Apparatus for welding together layers of an end closure of a container comprising: an anvil having a support surface for engaging one outer surface of the layers; and vibrating means engageable with the opposite outer surface of the layers when said one outer surface is engaged with said support surface, said vibrating means being operable to vibrate at a frequency sufficient to generate heat for welding the layers together; a portion of said support surface including means for accommodating variations in the thickness of the layers to minimize variations in pressure applied to the layers over the areas of the surface engaged by the support means and vibrating means; said last named means comprising: an elongated groove formed in said support surface; a strip of elastomeric material received in said groove having a thickness less than the depth of said groove; and a plate member received in said groove and resiliently supported on said strip of elastomeric material, the outer surface of said plate member projecting above the support surface in the unstressed condition of said strip of elastomeric material; and further including at least one screw securing said plate member to said anvil, said screw having a head and a shank, said shank having a nonthreaded portion extending from the head and a threaded portion extending from the nonthreaded portion, said shank extending through said plate member and the strip of elastomeric material with the threaded portion threadedly engaged with the base of said groove.

4. Apparatus for welding together layers of an end closure of a container at a welding station as containers are sequentially moved through the welding station, said containers each having a tubular body with the end closure thereof having front, rear and side panels each extending axially from the tubular body in its open position, each of said panels having a sealing strip defined at its outer end by a scored line, said side panels being bent inwardly between said front and rear panels and said front and rear panels being folded flat over the end of the tubular body in the closed position with said sealing strip projecting outwardly thereof in closed abutting relationship, said apparatus comprising: an anvil having an upper support surface for engaging one outer surface of the closed abutting sealing strips of the end closure of a container located at the welding station; said upper support surface being inclined with respect to the longitudinal axis of the container, said anvil having a lower surface extending transversely of the longitudinal axis of a container for engaging the outer surface of one of the flat front and rear panels of a container; vibrating welding means including a concentrating horn movable between an extended operable position for engaging the other outer surface of the closed abutting sealing strips of a container located at the welding station to clamp the sealing strips between the end of the horn and said inclined support surface, and a retracted inoperable position spaced from said inclined support surface, said horn being operable to vibrate at a frequency sufficient to generate heat for welding the sealing strips together; said horn being mounted for movement between said extended and retracted positions in a path perpendicular to said inclined support surface of said anvil, a portion of said support surface including means for accommodating variations in the thickness of the closed abutting sealing strips to minimize variations in pressure applied to the sealing strips over the areas engaged by the support surface and horn; means for moving containers into and out of said welding station; and actuating means engageable by a container as the container moves into the welding station to actuate the horn to move to its extended position from its retracted position to clamp the sealing strips of the end closure of the container between the horn and said support surface and weld the sealing strips together, and to actuate the horn to move to its retracted position when the welding operation is completed.

5. Apparatus as claimed in claim 4 wherein said means for accommodating variations in the thickness of the closed abutting sealing strips comprises grooves and recesses formed in said support surface at locations to be engaged by areas of increased thickness of the closed abutting sealing strips.

6. Apparatus as claimed in claim 4 wherein said means for accommodating variations in the thickness of the closed abutting sealing strips comprises a plate resiliently supported on said support surface for engagement by said one outer surface, said plate being yieldable to accommodate variations in the thickness of the closed abutting sealing strips to maintain a substantially uniform pressure along the band of the sealing strips between said plate and horn.

7. Apparatus as claimed in claim 6 further including an elongated groove formed in said support surface of said anvil, a strip of elastomeric material received in said groove and having a thickness less than the depth of said groove; said plate member being received in said groove and resiliently supported on said strip of elastomeric material with the outer surface of said plate member projecting above the support surface in the unstressed condition of said strip of elastomeric material.

8. Apparatus for welding together layers of an end closure of a container at a welding station as containers are sequentially moved through the welding station comprising: an anvil having an upper inclined support surface for engaging one outer surface of the layers of the end closure of a container located at the welding station; vibrating welding means including a concentrating horn movable between an extended operable position for engaging the other outer surface of the layers of a container at the welding station to clamp the layers between the end of the horn and said support surface; and a retracted inoperable position spaced from said support surface, said horn being operable to vibrate at a frequency sufficient to generate heat for welding the layers together; said horn being mounted for movement between said extended and retracted positions in a path perpendicular to said support surface of said anvil; a portion of said support surface including means for accommodating variations in the thickness of the layers to minimize variations in pressure applied to the layers over the areas engaged by the support surface and horn; means for moving containers into and out of said welding station; and actuating means engageable by a container as the container moves into the welding station to actuate the horn to move to its extended position from its retracted position to clamp the layers of the end closure of the container between the horn and said support surface and weld the layers together, and to actuate the horn to move to its retracted position when the welding operation is completed; wherein said means for accommodating variations in the thickness of the layers comprises a plate resiliently supported on said support surface for engagement by said one outer surface, said plate being yieldable to accommodate variations in the thickness of the layers to maintain a substantially uniform pressure along the band of the layers between said plate and horn; further including an elongated groove formed in said support surface of said anvil; a strip of elastomeric material received in said groove and having a thickness less than the depth of said groove; said plate member being received in said groove and resiliently supported on said strip of elastomeric material with the outer surface of said plate member projecting above the support surface in the unstressed condition of said strip of elastomeric material; and including at least one screw securing said plate member to said anvil, said screw having a head and a shank, said shank having a nonthreaded portion extending from the head and a threaded portion extending from the nonthreaded portion, said shank extending through said plate member and strip of elastomeric material with the threaded portion threadedly engaged with the base of said groove.

9. A method of closing and sealing an end closure of a thermoplastic coated paperboard container having a four-sided tubular body of rectangular cross-section wherein the end closure includes front, rear and side panels and a sealing flap each extending from the edge of a respective one of the sides of the container body in co-planar relationship therewith in the open position of the end closure; each of said panels and sealing flap having a sealing portion that overlaps in the closed position of the end closure; said method comprising the steps of: folding the end closure to its closed position with the sealing portions of the panels and sealing flap overlapping; positioning the sealing portions of said panels and sealing flap between the surface of an anvil having means for accommodating variations in the thickness of the sealing portions including the sealing portion of the sealing flap and the surface of a vibration welding horn; pressing the sealing portions against the anvil surface and energizing the horn with the sealing portions clamped between the surface of the horn and anvil at a substantially uniform pressure over substantially the entire length of the sealing portions including the sealing portion of the sealing flap for a predetermined period of time to activate the thermoplastic coating of the sealing surface to flow; deenergizing the horn; holding the sealing portions of the closed end closure in compression with the sealing portions against the surface of the anvil until the activated thermoplastic cools and sets to weld the sealing portions together; and removing the sealed end closure from said anvil surface.

10. A method of closing and sealing an end closure of a thermoplastic coated paperboard container having a four-sided tubular body of a rectangular cross-section wherein the end closure includes front, rear and side panels and a sealing flap each extending from the edge of a respective one of the sides of the container body in co-planar relationship therewith in the open position of the end closure, each of said panels and sealing flap having a sealing portion that overlaps in the closed position of the end closure; said method comprising the steps of: folding the end closure to its closed position with the sealing portions of the panels and sealing flap overlapping, positioning the sealing portions of said panels and sealing flap between the surface of an anvil having grooves and recesses thereon for accommodating variations in the thickness of the sealing portions including the sealing portion of the sealing flap and the surface of a vibration welding horn; pressing the sealing portions against the anvil surface to force the sealing portions of the end closure into the grooves and recesses and energizing the horn with the sealing portions clamped between the surface of the horn and anvil at a substantially uniform pressure over substantially the entire length of the sealing portions including the sealing portion of the sealing flap for a predetermined period of time to activate the thermoplastic coating of the sealing surface to flow; deenergizing the horn; holding the sealing portions of the closed end closure in compression with the sealing portions against the surface of the anvil until the activated thermoplastic cools and sets to weld the sealing portions together; and removing the sealed end closure from said anvil surface.

* * * * *

UNITED STATES PATENT AND TRADEMARK OFFICE
CERTIFICATE OF CORRECTION

PATENT NO. : 4,279,675

DATED : July 21, 1981

INVENTOR(S) : Eric A. Braun

It is certified that error appears in the above—identified patent and that said Letters Patent is hereby corrected as shown below:

On The Title Page, in the Abstract

Line 3, after "tainer" and before "closure", "and" should be --end--.

Line 8, after "flap" the dash "-" should be eliminated.

Column 4, line 46, after "closure" and before "7", --panel-- should be inserted.

Column 5, line 30, after "that", "its" should be --is--.

Column 9, line 40, after "converted" and before "frictional", "to" should be --into--.

Column 12, line 61, after "pipes" and before "and", the numerals "84" should be --184--.

Signed and Sealed this

Eighth Day of December 1981

[SEAL]

Attest:

GERALD J. MOSSINGHOFF

Attesting Officer

Commissioner of Patents and Trademarks